(12) United States Patent
Nowak

(10) Patent No.: US 8,196,941 B2
(45) Date of Patent: Jun. 12, 2012

(54) STRUT ASSEMBLY HAVING MULTI-PIECE SPRING SEAT

(75) Inventor: Michal Nowak, Ruda Slaska (PL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 260 days.

(21) Appl. No.: 12/772,459

(22) Filed: May 3, 2010

(65) Prior Publication Data

US 2011/0266765 A1    Nov. 3, 2011

(51) Int. Cl.
    *B60G 13/00*    (2006.01)

(52) U.S. Cl. ... 280/124.154; 280/124.145; 280/124.146; 280/124.151

(58) Field of Classification Search ........... 280/124.145, 280/124.146, 124.147, 124.151, 124.154
    See application file for complete search history.

(56) References Cited

U.S. PATENT DOCUMENTS

| | | | |
|---|---|---|---|
| 4,366,969 A * | 1/1983 | Benya et al. ................. | 280/6.15 |
| 4,721,325 A * | 1/1988 | Mackovjak et al. ... | 280/124.155 |
| 4,822,072 A * | 4/1989 | Preslicka et al. ........ | 280/124.154 |
| 5,467,971 A * | 11/1995 | Hurtubise et al. ............ | 267/220 |
| 5,487,535 A * | 1/1996 | Carter et al. .................. | 267/220 |
| 6,082,749 A * | 7/2000 | Smith et al. ............ | 280/124.155 |
| 6,149,171 A | 11/2000 | Bono et al. | |
| 6,155,543 A * | 12/2000 | Solomond et al. ............ | 267/216 |
| 6,367,830 B1 * | 4/2002 | Annequin et al. ....... | 280/93.512 |
| 6,692,012 B2 * | 2/2004 | Fullenkamp et al. .. | 280/124.154 |
| 2003/0222386 A1 | 12/2003 | Duerre et al. | |

FOREIGN PATENT DOCUMENTS

JP    2002-070915    3/2002

OTHER PUBLICATIONS

Written Opinion and Search Report dated Dec. 26, 2011 in corresponding PCT application No. PCT/US2011/032834.

* cited by examiner

*Primary Examiner* — Toan To
(74) *Attorney, Agent, or Firm* — Harness, Dickey & Pierce, PLC

(57) ABSTRACT

A strut assembly includes a top mount assembly, a shock absorber, a multi-piece lower spring seat and a spring extending between the top mount assembly and the multi-piece lower spring seat. The multi-piece lower spring seat includes a spring seat belt holding the spring and a plurality of seating supports that are attached to the shock absorber and which support the spring seat belt.

16 Claims, 4 Drawing Sheets

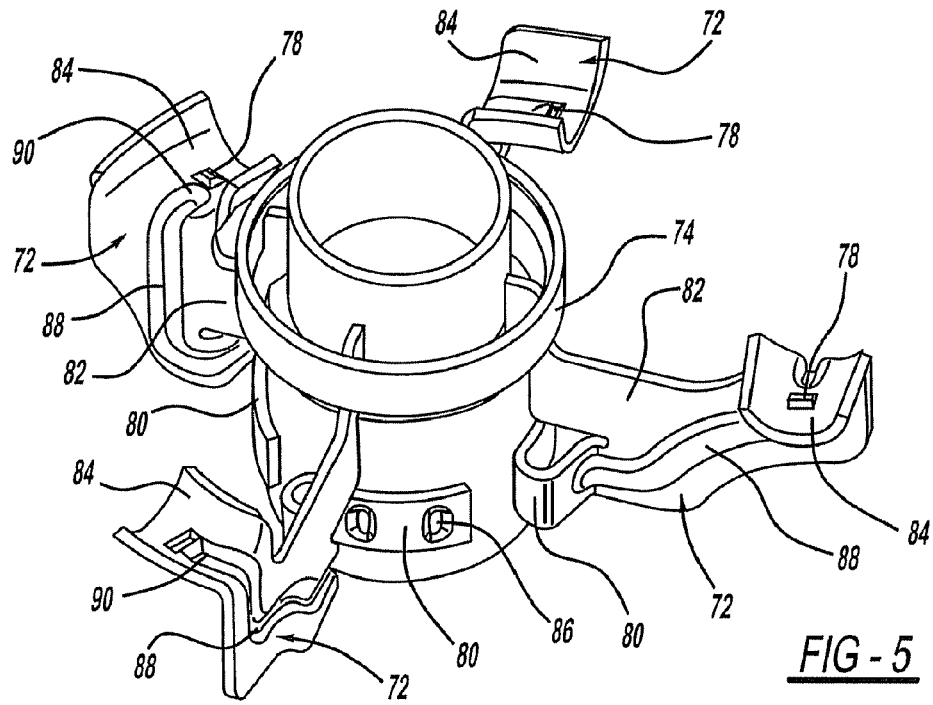
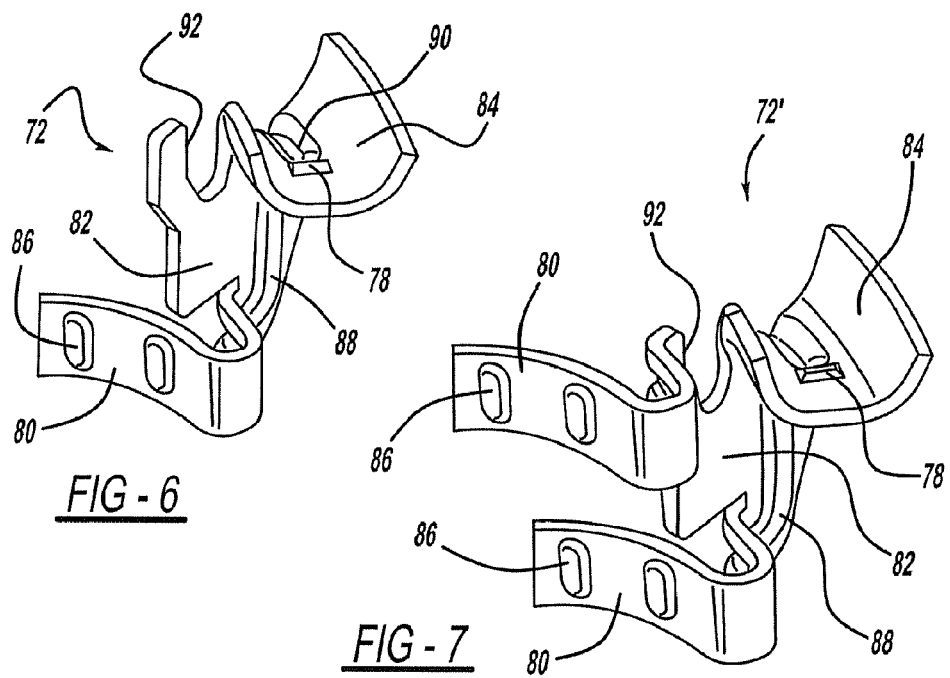

STRUT ASSEMBLY HAVING MULTI-PIECE SPRING SEAT

FIELD

The present disclosure relates to a McPherson strut assembly for a motor vehicle. More particularly, the present disclosure relates to the spring seat of the McPherson strut assembly.

BACKGROUND

This section provides background information related to the present disclosure which is not necessarily prior art.

Strut-type suspension systems are well known in the motor vehicle industry. A telescopic strut normally incorporating a hydraulic damper is used as one of the locating members for the wheel of the motor vehicle. The most common form of a strut-type suspension is the McPherson strut suspension system. The McPherson strut assembly includes a coil spring located concentrically around the telescopic strut which is the shock absorber. The upper end of the McPherson strut assembly includes an upper mounting assembly which is mounted in a tower formed by the vehicle body at a position above the wheel arch of the vehicle.

The coil spring is located around the shock absorber and it extends between an upper spring seat which is a part of the top mount assembly for the strut assembly and a lower spring seat which is attached, typically by welding, to the shock absorber of the strut assembly. The spring seats of the strut assembly have several functions for the suspension system. The spring seats support and maintain the correct position of the spring and support the loading on the spring under all driving conditions of the vehicle for the entire life of the vehicle. The spring seats are mechanically resistant during the life of the vehicle. They resist braking loads, deformations, wear, abrasion, changing loads and hits by stones and other debris. The spring seat is environmental and corrosion resistant to different temperatures, different moisture levels, aggressive liquids and gasses. The spring seats ensure proper fixing of the components of the strut assembly, easy assembly of the strut assembly into the vehicle and with the other components of the strut assembly they resist any unwanted displacements and/or rotations. The design of the spring seats also ensure that the spring to spring seat contact does not promote or accelerate corrosion of the spring or the spring seat.

The prior art lower spring seats typically include a single piece formed spring seat. The single piece spring seat has a contoured portion that mates with the terminal end of the spring and a flanged portion that is welded to the outer tube of the shock absorber of the strut assembly. These single piece lower spring seats have restrictions with the shape forming process, restrictions in the design for reinforcing the spring seat, difficulties with the assembly to the shock absorber, issues relating to water, sand, dust and other debris retention, issues relating to cooperation with other components of the strut assembly and suspension assembly and they are relatively heavy due to their single piece design.

SUMMARY

This section provides a general summary of the disclosure, and is not a comprehensive disclosure of its full scope or all of its features.

The present disclosure is directed to a multi-piece lower spring seat which addresses the various issues and problems associated with the single piece design of the lower spring seat. The use of a multi-piece lower spring seat allows for the optimizing of the design to meet the load requirements for a specific application. The material, design, thickness and shape of each individual component can be optimized for a specific application. The number of the supports for the multi-piece lower spring seat can also be varied to meet a specific application. Each of the seating supports functions as a rib that reinforces the strength of the lower spring seat and provides more design freedom in the development of the lower spring seat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view of the lower spring seat illustrated in FIGS. 2-4 with the spring seat belt removed;

FIG. 6 is a perspective view of a typical seating support illustrated in FIGS. 2-5; and FIG. 7 is a perspective view of a seating support in accordance with the present disclosure.

Corresponding reference numerals indicate corresponding parts throughout the several views of the drawings.

DETAILED DESCRIPTION

Example embodiments will now be described more fully with reference to the accompanying drawings.

Figure 1:
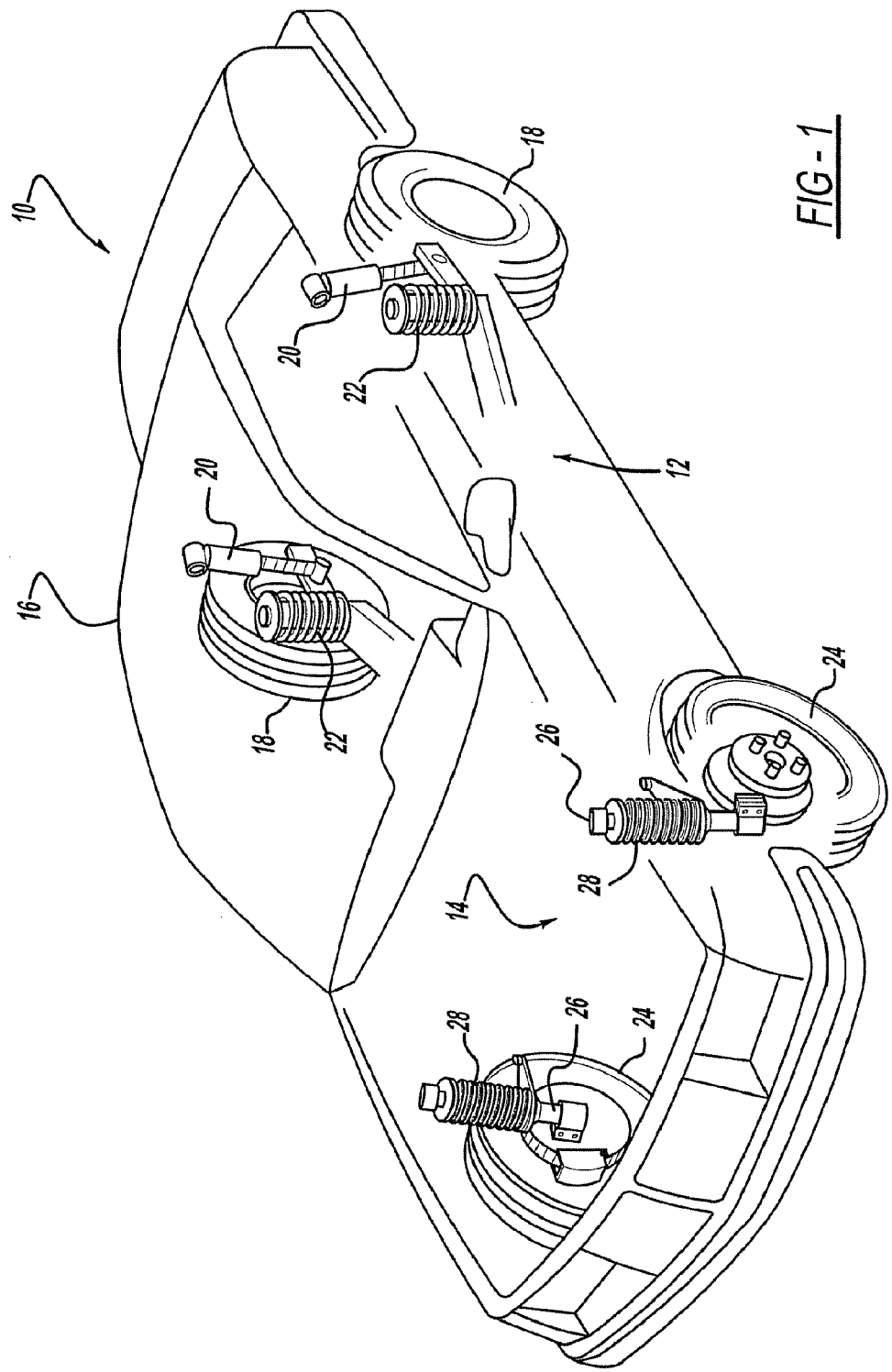
FIG. 1 is an illustration of an automobile using the McPherson strut assemblies in accordance with the present invention.

There is shown in FIG. 1 a vehicle incorporating a suspension system having the strut assembly in accordance with the present invention and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly front suspension 14 includes a transversely extending front axle assembly (not shown) to operatively support the vehicle's front wheels 24. The front axle assembly is operatively connected to body 16 by means of a second pair of shock absorbers 26 and by a pair of shaped helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles and/or in other types of applications such as vehicles incorporating independent front and/or independent rear suspension systems. Further, the term "shock absorber"

as used herein is meant to be dampers in general and thus will include McPherson struts. Also, while front suspension 14 is illustrated having a pair of McPherson struts or shock absorbers 26, it is within the scope of the present invention to have rear suspension 12 incorporate a pair of McPherson struts or shock absorbers 26 if desired.

Figure 2:
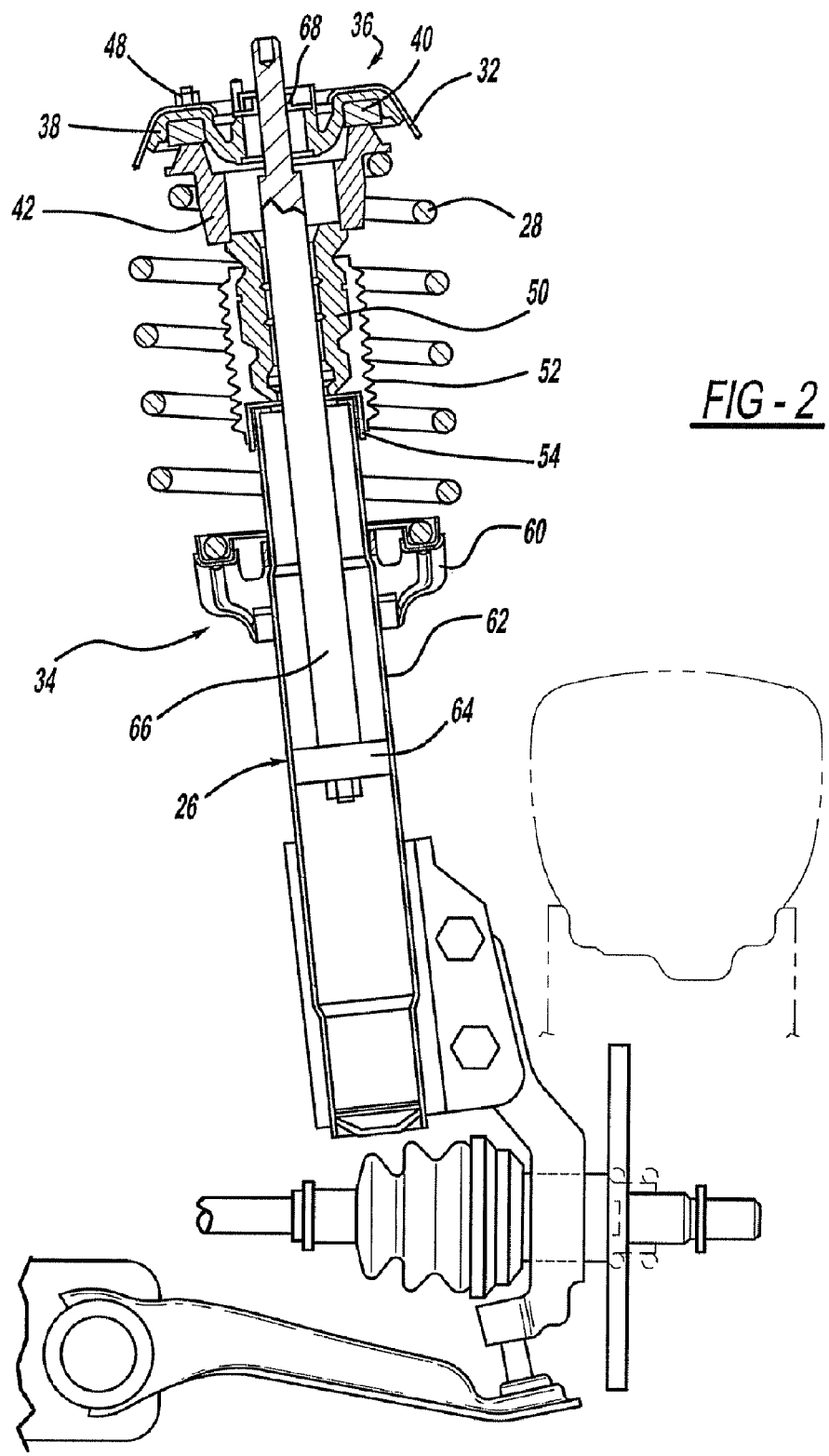
FIG. 2 is a side view of one of the front suspension units that incorporate the McPherson strut assembly in accordance with the present invention.
Figure 3:
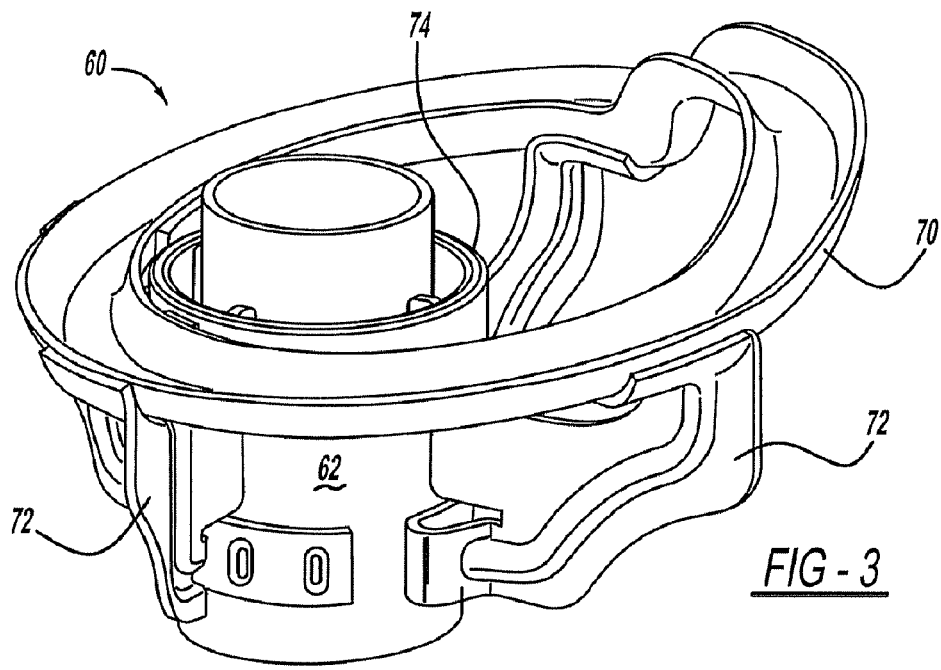
FIG. 3 is a perspective view of the lower spring seat assembly illustrated in FIG. 2.
Figure 4:
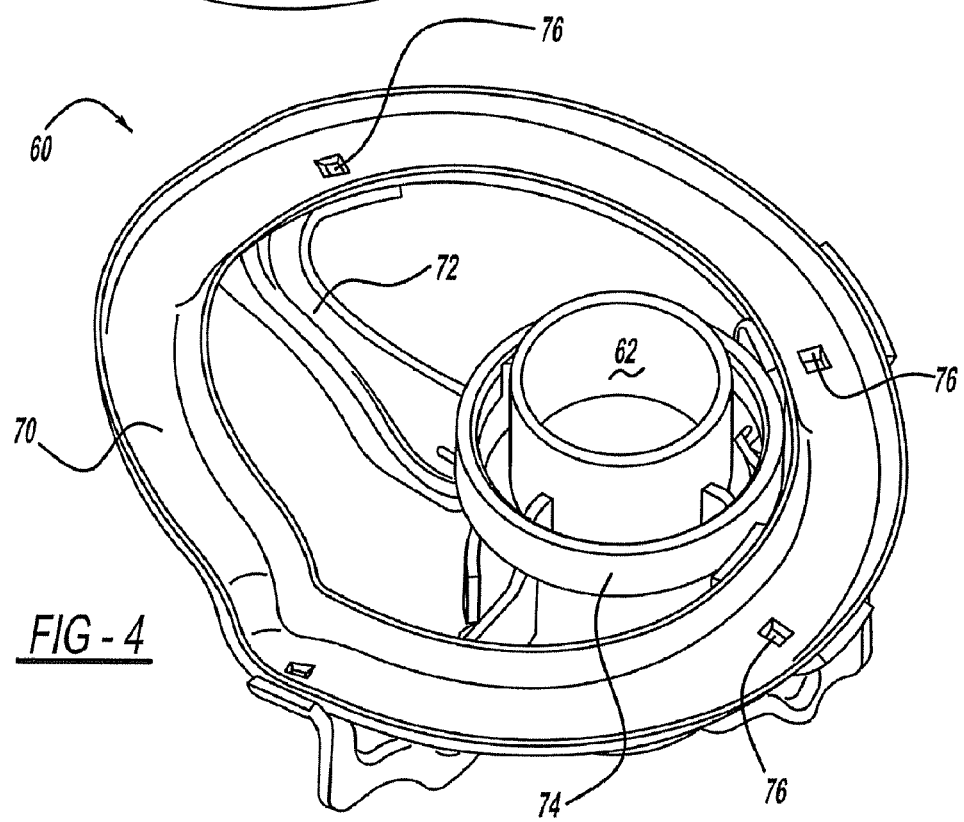
FIG. 4 is a perspective view of the lower spring seat assembly illustrated in FIGS. 2 and 3.

Referring now to FIG. 2, the front wheel assembly for vehicle 10 is illustrated in greater detail. Body 16 defines a shock tower 32 comprising sheet metal of vehicle 10 within which is mounted a McPherson strut assembly 34 which comprises a telescoping device in the form of shock absorber 26, coil spring 28 and a top mount assembly 36. McPherson strut assembly 34 including shock absorber 26, coil spring 28 and top mount assembly 36 are attached to vehicle 10 using shock tower 32. Top mount assembly 36 comprises a top mount 38, a bearing assembly 40 and an upper spring seat 42. Top mount 38 comprises an integral molded body and a rigid body member, typically made of stamped steel. Top mount assembly 36 is mounted to shock tower 32 by bolts 48. Bearing assembly 40 is friction fit within the molded body of top mount 38 to be seated in top mount 38 so that one side of bearing assembly 40 is fixed relative to top mount 38 and shock tower 32. The second side of bearing assembly freely rotates with respect to the first side of bearing assembly 40, top mount 38 and shock tower 32.

The free rotating side of bearing assembly 40 carries upper spring seat 42 that is clearance fit to the outer diameter of bearing assembly 40. A jounce bumper 50 is disposed between upper spring seat 42 and shock absorber 26. Jounce bumper 50 comprises an elastomeric material which is protected by a plastic dirt shield 52. A bumper cap 54 is located on shock absorber 26 to interface with jounce bumper 50 and plastic dirt shield 52.

A multi-piece lower spring seat 60 is attached to shock absorber 26 and coil spring 28 is disposed between upper spring seat 42 and multi-piece lower spring seat 60 to isolate body 16 from front suspension 14. Shock absorber 26 comprises a pressure tube 62, a piston assembly 64 and a telescoping rod or piston rod 66. While shock absorber 26 is illustrated as a mono-tube design, it is within the scope of the present invention to utilize a dual-tube shock absorber for shock absorber 26. Also, while shock absorber 26 is illustrated in FIG. 2, it is to be understood that shock absorber 20 may also include the features described herein for shock absorber 26.

Prior to the assembly of McPherson strut assembly 34 into vehicle 10, the pre-assembly McPherson strut assembly 34 is performed. Bumper cap 54, jounce bumper 50 and plastic dirt shield 52 are assembled to shock absorber 26. Coil spring 28 is assembled over shock absorber 26 and positioned within multi-piece lower spring seat 60. Upper spring seat 42 is assembled onto shock absorber 26 and correctly positioned with respect to coil spring 28. Bearing assembly 40 is positioned on top of upper spring seat 42 and top mount 38 is positioned on top of bearing assembly 40. This entire assembly is positioned within an assembly machine which compresses coil spring 28 such that the end of piston rod 66 extends through a bore located within top mount assembly 36. A retaining nut 68 is threadingly received on the end of piston rod 66 to secure the assembly of McPherson strut assembly 34.

Top mount 38 is designed as an identical component for the right and left hand sides of the vehicle but it has a different orientation with respect to shock absorber 26 and its associated bracketry when it is placed on the right or left side of the vehicle.

Referring now to FIGS. 3-6, multi-piece lower spring seat 60 is illustrated in greater detail. Multi-piece lower spring seat 60 comprises a spring seat belt 70, a plurality of seating supports 72 and a reinforcing ring 74.

Spring seat belt 70 is an annular member having a generally U-shaped cross-section that cradles coil spring 28. Spring seat belt 70 can be manufactured from metal or it can be manufactured from plastic. When spring seat belt 70 is manufactured from plastic, additional weight savings can be achieved, the wear from coil spring 28 can be reduced and better corrosion resistance is achieved. This can eliminate the need for corrosion protection of coil spring 28. The preferred plastic for spring seat belt 70 is PA66 with 50% glass fibers.

Spring seat belt 70 defines a plurality of optional tabs 76. Each tab 76 is designed to be inserted into a respective slot 78 formed in each of the plurality of seating supports 72. The mating of tabs 76 and slots 78 assures the proper seating and positioning of spring seat belt 70 onto the plurality of seating supports 72.

FIG. 6 illustrates one of the plurality of seating supports 72. While only one of the plurality of seating supports 72 is illustrated in detail, the following description of seating support 72 applies to all of the plurality of seating supports 72. Each seating support 72 comprises a tube attachment portion 80, a generally upright supporting portion 82 and a spring seat belt supporting portion 84.

Tube attachment portion 80 is an arcuate flange section which is shaped to mate with pressure tube 62 of shock absorber 26. While the plurality of seating supports 72 are illustrated as being attached to pressure tube 62 of mono-tube shock absorber 26, it is within the scope of the present disclosure to attach the plurality of seating supports 72 to a reserve tube of a dual-tube shock absorber. The arcuate flange portion of tube attachment portion 80 defines a plurality of projections 86 which are welding projections for projection welding of seating support 72 to pressure tube 62. An arcuate section connects tube attachment portion 80 to generally upright supporting portion 82.

Generally upright supporting portion 82 is a plate shaped section that defines one or more reinforcing ribs 88 which stiffen generally upright supporting portion 82. Spring seat belt supporting portion 84 is a generally U-shaped section that cradles spring seat belt 70 and which defines slot 78. Spring seat belt supporting portion 84 defines a stiffening rib 90 which, as disclosed in FIG. 5, can be a continuation of stiffening rib 88 on generally upright supporting portion 82.

Each seating support 72 can be individually designed to meet specific requirements of the position that seating support 72 is located. While the present disclosure illustrates four seating supports 72, the present disclosure can utilize less than four or more than four seating supports 72 as the application requires. Each seating support 72 can be made from different materials, different thicknesses and different shapes depending on the requirements of a specific application.

Reinforcing ring 74 is an annular component which secures the upper portion of each seating support 72. Each seating support 72 defines a slot 92 within which reinforcing ring 74 is located. Reinforcing ring 74 can be manufactured from metal or it can be manufactured from plastic. Reinforcing ring 74 resists the rotation of the plurality of seating supports which could occur due to the loads applied to the plurality of seating supports 72 from coil spring 28 through spring seat belt 70.

Additional embodiments of the present disclosure include seating supports 72 without projections 86 and the use of one or more reinforcing rings 74. In addition, when a dual-tube shock absorber is used, the reserve tube of the shock absorber can be swaged which creates a shoulder which supports and protects the multi-piece spring seat.

FIG. 7 illustrates a different embodiment for the seating supports of the present disclosure. A seating support 72' is designed to be used without a reinforcing ring 74. Seating support 72' is the same as seating support 72 except that slot 92, which accepts reinforcing ring 74, has been replaced with a second or upper tube attachment portion 80 which includes a second plurality of projections 86. As illustrated in FIG. 7, the radial positioning of the upper tube attachment portion 80 is offset from the lower tube attachment portion 80 to accommodate a swaged tube to which seating support 72' is secured. If there is no swag on the tube, the position of upper and lower attachment portions would be the same.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A strut assembly comprising: a top mount assembly including an upper spring seat; a shock absorber attached to said top mount assembly; a multi-piece lower spring seat attached to said shock absorber; and a spring disposed between said upper spring seat and said multi-piece lower spring seat, wherein said multi-piece lower spring seat further comprises: a spring seat belt engaging said spring; and a plurality of seating supports attached to said spring seat belt and attached to said shock absorber, wherein each of said plurality of seating supports comprises a tube attachment portion attached to said shock absorber; a spring seat belt supporting portion attached to said spring seat belt; and an upright supporting portion disposed between said tube attachment portion and said spring seat belt supporting portion.

2. The strut assembly according to claim 1, further comprising a reinforcing ring engaging each of said plurality of seating supports.

3. The strut assembly according to claim 1, wherein said spring seat belt defines one of a slot and a tab and said spring seat belt supporting portion defines the other of the slot and the tab, the tab engaged with the slot to position said spring seat belt in relation to said spring seat belt supporting portion.

4. The strut assembly according to claim 1, wherein said upright portion defines a reinforcement rib.

5. The strut assembly according to claim 4, wherein said spring seat belt supporting portion defines a reinforcement rib.

6. The strut assembly according to claim 1, wherein said spring seat belt supporting portion defines a reinforcement rib.

7. The strut assembly according to claim 1, wherein said tube attachment portion defines a projection engaging said tube.

8. The strut assembly according to claim 1, wherein said arcuate flange portion defines a projection engaging said tube.

9. The strut assembly according to claim 1, wherein said spring seat belt defines one of a tab and a slot and one of the plurality of seating supports define the other of the slot and the tab, the tab engaging the slot to position said spring seat belt in relation to said one of the plurality of seating supports.

10. The strut assembly according to claim 1, wherein said spring seat belt defines one of a plurality of tabs and a plurality of slots and the plurality of seating supports defining the other of the plurality of slots and the plurality of tabs, each tab engaging a respective slot to position said spring seat belt in relation to said plurality of seating supports.

11. The strut assembly according to claim 1, wherein each of said plurality of seating supports defines a reinforcement rib.

12. The strut assembly according to claim 1, wherein each of said plurality of seating supports comprise:
   an arcuate flange portion attached to said tube;
   a generally U-shaped spring seat belt supporting portion attached to said spring seat belt; and
   a plate shaped upright supporting portion disposed between said arcuate flange portion and said generally U-shaped spring seat belt supporting portion.

13. The strut assembly according to claim 12, wherein said spring seat belt defines one of a slot and a tab and said generally U-shaped spring seat belt supporting portion defines the other of the slot and the tab, the tab engaged with the slot to position said spring seat belt in relation to said generally U-shaped spring seat belt supporting portion.

14. The strut assembly according to claim 12, wherein said plate shaped upright portion defines a reinforcement rib.

15. The strut assembly according to claim 14, wherein said generally U-shaped spring seat belt supporting portion defines a reinforcement rib.

16. The strut assembly according to claim 12, wherein said spring seat belt supporting portion defines a reinforcement rib.

\* \* \* \* \*